Dec. 31, 1957    M. H. FENNIMORE ET AL    2,817,976
VARIABLE SPEED TRANSMISSION

Filed July 16, 1956    3 Sheets-Sheet 1

INVENTOR.
Marion H. Fennimore
Ivan Stephenson
BY
Atty.

Dec. 31, 1957 M. H. FENNIMORE ET AL 2,817,976
VARIABLE SPEED TRANSMISSION
Filed July 16, 1956 3 Sheets-Sheet 2
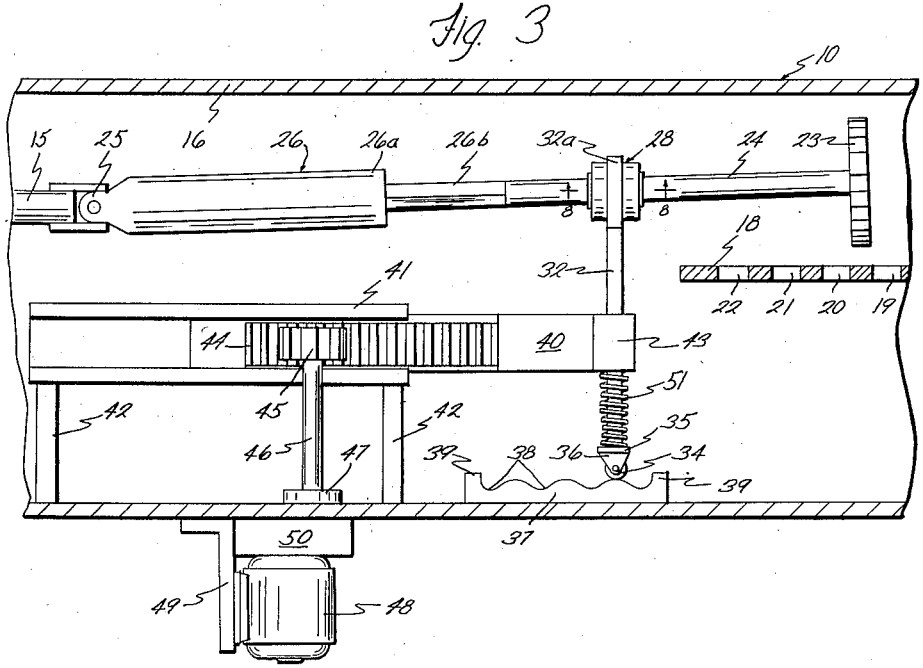
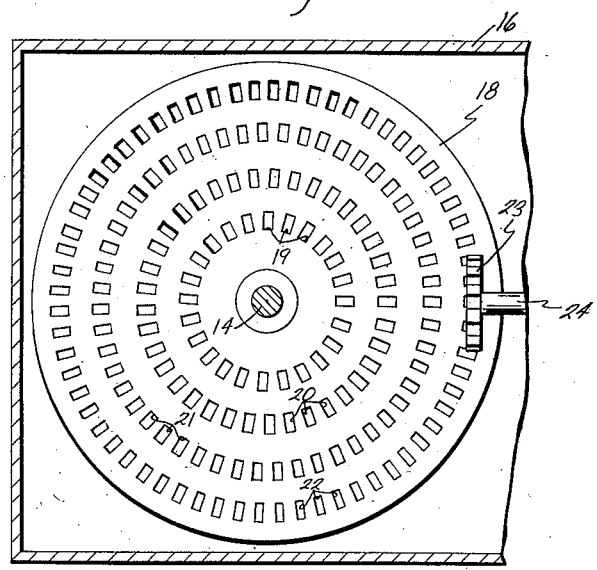
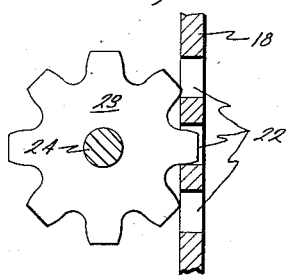
INVENTOR.
Marion H. Fennimore
Ivan Stephenson
BY
Atty.

Dec. 31, 1957    M. H. FENNIMORE ET AL    2,817,976
VARIABLE SPEED TRANSMISSION
Filed July 16, 1956    3 Sheets-Sheet 3

INVENTOR.
Marion H. Fennimore
Ivan Stephenson
BY
Creehwells
Atty.

United States Patent Office 2,817,976
Patented Dec. 31, 1957

2,817,976

VARIABLE SPEED TRANSMISSION

Marion H. Fennimore and Ivan Stephenson, La Crosse, Wash.

Application July 16, 1956, Serial No. 597,925

7 Claims. (Cl. 74—351)

The present invention relates to improvements in variable speed transmissions, and more particularly to improvements in variable speed transmissions for agricultural implements such as combine harvesters and the like.

It is the principal purpose of the invention to provide a variable speed transmission unit having an input power shaft and an output power shaft, the shafts being drivingly connected by means of a pinion engaged with a disk or face wheel, and having novel means for engaging the pinion with the disk at various radial distances from the center thereof.

A further purpose of the invention is to provide such a device wherein the means for engaging the pinion with the disk at selected radial distances from the center of the disk are operated through the simple rotation of a control shaft, the control shaft being rotatable by remote control.

Our invention is particularly adapted for combine reel drive mechanisms. In operating a combine harvester it is often desirable to vary the reel speed independently of the ground speed of the vehicle, or the speed of any other operating parts of the vehicle. It is also desirable to be able to stop the reel at any time independently of other operating parts. With our device connected between the reel shaft and the power shaft for the reel, both independent reel speed control and instantaneous declutching of the reel are possible, thus giving the combine operator complete control of the reel at all times.

The nature and advantages of the invention will appear more clearly from the following description and the accompanying drawings, wherein a preferred form of the invention is shown. It should be understood, however, that the description and drawings are illustrative only and are not intended to limit the invention, except insofar as as it is limited by the claims.

In the drawings:

Figure 3 is an enlarged fragmentary view of the device similar to Figure 2, but showing the pinion disengaged from the disk;

Figure 4 is an enlarged fragmentary sectional view taken substantially on the line 4—4 of Figure 2;

Figure 7 is an enlarged fragmentary sectional view taken on the line 7—7 of Figure 2.

Figure 1:
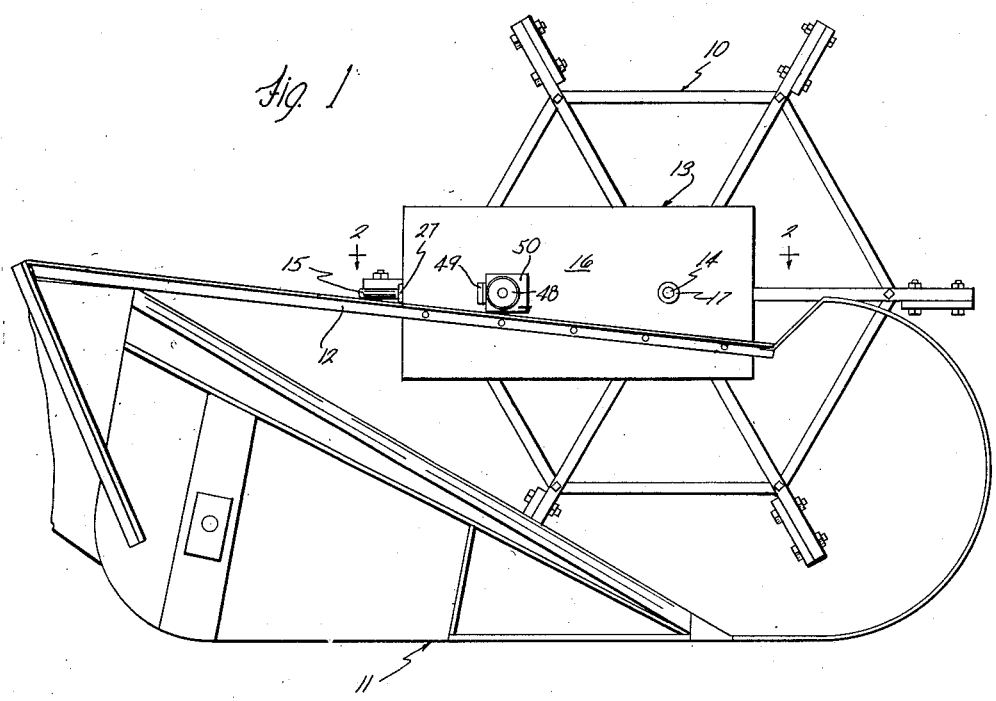
Figure 1 is a fragmentary elevational view of a combine header showing our invention incorporated in the reel driving mechanism.
Figure 2:
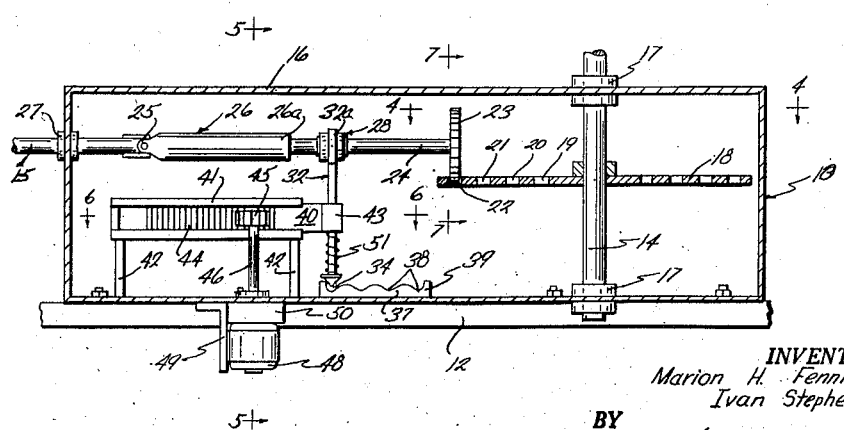
Figure 2 is an enlarged plan sectional view of our invention taken substantially on the line 2—2 of Figure 1.
Figure 5:
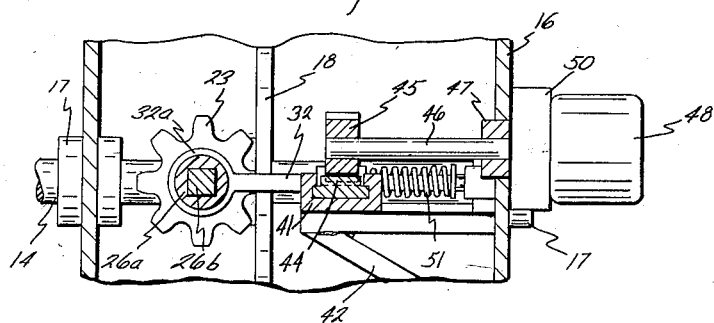
Figure 5 is an enlarged fragmentary sectional view taken on the line 5—5 of Figure 2.

Referring now to the drawings, and to Figures 1, 2 and 3 in particular, our variable speed transmission unit is shown as incorporated in the driving mechanism for a reel 10 on a combine harvester header generally indicated at 11. The reel 10 is supported by reel carrying arms 12 which extend forwardly over the header 11. Our variable speed control device, generally indicated at 13 is adapted to be mounted on one of the reel carrying arms 12, and to form one of the end bearings for the reel shaft 14. Driving power for the reel is supplied through a power input shaft 15 which extends forwardly from the combine and enters the device 13. Power from the shaft 15 is transmitted through the device 13 as hereafter described and supplied to a power output shaft which, in this installation of the invention, is the reel shaft 14. It will be readily understood, however, that the shaft 14 may, in other installations, drive mechanisms other than harvester reels, or in the event that the device is to be used as a reel drive control, but positioned at a different location than shown in Figure 1, the shaft 14 may be fitted with gear or sprocket means to drive a reel shaft spaced away from the shaft 14.

As best shown in Figures 2 and 3, the device 13 comprises a housing body 16 in which the several parts are mounted. The power output shaft 14 is journalled in bearings 17 adjacent one end of the body 16. The shaft 14 has fixed thereon a disk 18. The disk 18, as shown in Figure 4, has a plurality of apertures therein arranged in four concentric circulator sets 19, 20, 21 and 22. The sets of apertures 19–22 are spaced radially an equal distance from each other. A pinion 23, fixed on the end of a shaft 24, is positioned adjacent one face of the disk 18 and is adapted to engage in the apertures of any of the sets 19–22. The shaft 24 which carries the pinion 23 extends at right angles to the power output shaft 14 and has a universal connection 25 at its end. The shaft 24 has a telescoping extensible portion 26 therein to permit the pinion 23 to be moved radially toward and away from the shaft 14. The extensible portion 26 comprises a sleeve 26a and a splined shaft 26b non-rotatably received therein.

The universal connection 25 connects the shaft 24 with the input power shaft 15 which enters the housing body 16 at the end thereof opposite the shaft 14. The shaft 15 is journalled in a bearing 27 mounted in the body 16. The input power shaft 15 drives the pinion 23 through the universal connection 25 and shaft 24. The pinion 23 in turn drives the output power shaft through engagement with the apertures of any of the sets 19–22 in the disk 18. It will be understood that if the shaft 24 is extended until the pinion 23 engages the innermost set of apertures 19, the shaft 14 will be driven at its fastest relative speed with respect to the speed of the shaft 15. If the pinion 23 is engaged with the outermost set of apertures 22, the shaft 14 will be driven at its slowest relative speed. The simple movement of the pinion 23 radially toward and away from the shaft 14 effects the speed variation of the shaft 14.

Figure 8:
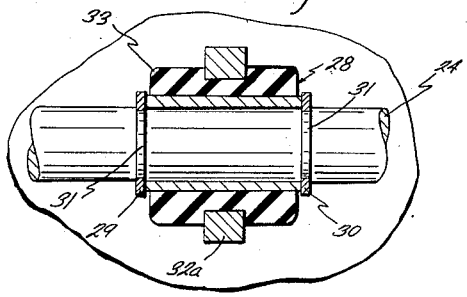
Figure 8 is an enlarged fragmentary sectional view taken on the line 8—8 of Figure 3.

In order to move the pinion radially toward and away from the shaft 14, and to disengage it from the disk 18 during movement, a novel remote controlled actuating mechanism is employed. On the shaft 24 between the extensible portion 26 and the pinion 23, a bearing 28 is mounted. Snap rings 29 and 30, best shown in Figure 8, are fixed at each end of the bearing 28 in slots 31 formed in the shaft 24. The snap rings 29 and 30 prevent endwise movement of the bearing 28 on the shaft 24. The bearing 28 is carried by an arm 32. The arm 32 has an enlarged ring 32a at its end in which the bearing 28 is secured. A rubber grommet 33 is positioned between the bearing 28 and ring 32a to permit limited angular displacement of the bearing 28 in the ring 32a. The arm 32 extends parallel to the output power shaft 14 toward one wall of the body 16. At the end of the arm 32, a cam follower wheel 34 is mounted.

The wheel 34 is carried by a plate 35 having ears 36 thereon and welded to the end of the arm 32. A cam 37 is fixed to the housing body 16 adjacent the end of the arm 32. The cam 37 extends toward the output power shaft 14 and has therein four equally spaced depressions 38. The depressions 38 are spaced apart distances equal to the distances between the sets of apertures 19–22. The cam 37 has outwardly extending barriers 39 at each end. The follower wheel 34 is adapted to engage the cam 37 and ride thereon. When the follower wheel 34 is positioned in one of the depressions 38, the arm 32 maintains the shaft 24 in position so that the pinion is engaged with the disk 18. The cam 37 is so positioned with respect to the shaft 14 that when the follower wheel 34 is positioned in a depression 38, the pinion is aligned with one of the sets of apertures 19–22. With this construction, movement of the arm 32 bodily toward or away from the shaft 14 will effect the speed variation of the shaft 14 with respect to the input power shaft 15. Assuming that the mechanism is in the position shown in Figure 2 and the pinion 23 is driving the disk 18 through the outermost set of apertures 22, movement of the arm 32 toward the shaft 14 will cause the follower wheel 34 to ride out of the first depression 38 in the cam 37. This will move the shaft 24 toward the center of the disk 18 and at the same time pivot the shaft 24 away from the disk 18 about the universal connection 25, thus disengaging the pinion 23 from the apertures 22. The apertures 22 are large enough in the radial direction to allow the pinion 23 to move endwise and outwardly without binding. When the arm 32 is positioned so that the follower wheel 34 is positioned between depressions 38 in the cam 37, the pinion 23 is disengaged and no driving force is transmitted to the shaft 14. When the arm 32 is moved still farther toward the shaft 14, the follower wheel 34 moves into the next depression 38 and the pinion 23 is moved into engagement with the apertures 21. This movement of the arm 32 so that its follower wheel 34 travels from one depression 38 to the next adjacent depression 38 causes first complete disengagement of the pinion 23 and disk 18 and then reengagement at a different driving ratio.

Figure 6:
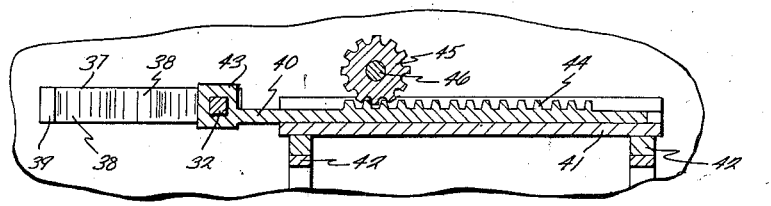
Figure 6 is an enlarged fragmentary sectional view taken on the line 6—6 of Figure 2.

In order to move the arm 32 as described, an actuating bar 40 is employed. The bar 40 is slidably mounted in a C-shaped slide plate 41 supported on a framework 42 in the housing body 16. The bar 40 is slidably seated in the plate 41 and secured against displacement in all directions except toward and away from the shaft 14. The bar 40 has a transverse sleeve 43 fixed to the end thereof adjacent the arm 32 in which the arm 32 is supported. As shown in Figure 6, the sleeve 43 is square in cross section as is the arm 32, so that the arm 32 is slidably, but non-rotatably held.

The actuating bar 40 has a rack 44 thereon which is engaged by a pinion 45. The pinion 45 is fixed to a control shaft 46 journalled in a bearing 47 in the housing body 16. A small electric motor 48, mounted on a bracket 49 on the outside of the body 16, drives the control shaft 46 through a reduction gear box 50. With this construction, the control shaft 46 may be rotated in either direction to slide the actuating bar in the slide plate 41. The actuating bar 40 moves the arm 32 toward and away from the output power shaft 14 to cause the speed variation of the output power shaft 14 as hereinbefore described.

Since the pinion 23 rotates constantly during speed changes, it is possible that when the arm 32 is moved from one position to another, the teeth of the pinion will not immediately mesh with the apertures of the set 19, 20, 21 or 22 which it is aligned with. In order to insure that the pinion will move into engagement when the teeth thereon have moved into alignment, a spring 51 is provided on the arm 32 between the supporting sleeve 43 and the plate 35 which supports the follower wheel 34. This spring forces the arm 32 endwise toward the cam 37 to maintain the wheel 34 against the cam 37, and urges the pinion 23 into engagement with the disk 18 whenever the wheel 34 is aligned with a depression 38 in the cam 37.

With the device just described the operator may select any of the four possible speeds of the output shaft 14 by merely operating an electrical control device for the motor 48. Such a control device (not shown) may be mounted at any point on the combine harvester. The operator may, by operating the motor 48 in either direction, stop the shaft 14 immediately by causing the arm 32 to be moved until the follower wheel 34 is between depressions 38 in the cam 37.

Our invention provides a simple and extremely economical variable speed transmission unit which will operate efficiently to give complete control of the output shaft 14 from a remote point. The device has few moving parts, and no complicated mechanisms which are susceptible to frequent break downs. It will be understood, of course, that whereas four speed selections are possible with the device illustrated, it is possible to include more speed selections by merely providing more sets of apertures in the disk 18 and a corresponding number of depressions in the cam 37. It is also possible to actuate the control shaft 46 by means other than the motor 48, as for instance, a simple crank or wheel.

We believe the nature and advantages of the invention appear clearly from the foregoing description and the accompanying drawings.

Having thus described our invention, we claim:

1. In a variable speed transmission having a housing, a shaft journalled in the housing, a disk fixed on the shaft, a second shaft extending at right angles to the first named shaft, and a pinion on said second shaft drivingly engageable with one face of the disk, means for engaging the pinion with the disk at selected radial distances from the center thereof comprising a universal joint in the second shaft whereby to permit angular displacement of said second shaft to move the pinion into and out of engagement with the disk, an extensible portion interposed in the second shaft between the universal joint and the pinion whereby to permit endwise movement of the pinion radially toward and away from the center of the disk, arm means rotatably but non-slidably secured to the second shaft, actuating means connected to the arm means and operable to move the arm means toward and away from the disk whereby to move the pinion radially toward and away from the center of the disk, and cam means engaged with the arm means operable to move the arm means in a direction parallel to the axis of the disk as the arm means is moved toward and away from the disk whereby to disengage the pinion from the disk at selected radial distances from the center of the disk and to engage the pinion with the disk at selected radial distances from the center of the disk.

2. In a variable speed transmission having a housing, a disk, a pinion drivingly engageable with one face of said disk, a shaft journalled in the housing and supporting said disk, and a second shaft supporting said pinion, means for engaging the pinion at selected radial distances from the center of the disk comprising a universal connection interposed in said second shaft whereby to permit angular displacement of said second shaft to move the pinion into and out of engagement with the disk, an extensible portion interposed in said second shaft whereby to permit the pinion to be moved radially toward and away from the center of the disk, an arm rotatably but non-slidably secured to said second shaft between the extensible portion and the pinion, said arm extending parallel to the axis of the disk, cam follower means at the free end of the arm, a cam supported by the housing, said follower means engaged with the cam, the cam having spaced apart depressions therein, said depressions being aligned in a line extending perpendicular to the axis of the disk and in a common plane with the second shaft, the arm operable to hold the pinion in engagement with the disk when the follower means is positioned in a depression in said cam and to hold the pinion out of engagement with the disk when the follower means is positioned between depressions, and means to move the arm toward and away from the disk.

3. In a variable speed transmission having a housing, a shaft journalled in the housing, a disk fixed on the shaft, a second shaft extending at right angles to the first named shaft, and a pinion on said second shaft drivingly engageable with one face of the disk, means for engaging the pinion with the disk at selected radial distances from the center thereof comprising a universal joint in the second shaft whereby to permit angular displacement of said second shaft to move the pinion into and out of engagement with the disk, an extensible portion interposed in the second shaft between the universal joint and the pinion whereby to permit endwise movement of the pinion radially toward and away from the center of the disk, an arm rotatably but non-slidably secured to the second shaft, actuating means connected to said arm and operable to move the arm toward and away from the disk whereby to move the pinion radially with respect to the disk, a cam supported in the housing and having an actuating surface, the actuating surface having spaced apart depressions therein, a cam follower on the arm and engaged with the actuating surface of the said follower operable to move against the actuating surface of the cam as the arm is moved toward and away from the disk to move the arm axially of the disk as it moves toward and away therefrom, whereby to pivot the second shaft about the universal joint and engage the pinion with the disk at selected radial distances from the center of the disk and disengage the pinion from the disk between said selected distances, and spring means on the arm holding the follower against the cam.

4. A variable speed transmission comprising a housing, a shaft journalled in the housing, a disk fixed to said shaft, said disk having a plurality of spaced apart circular concentric pinion engaging portions therein, a pinion drivingly engageable with said portions on the disk, a second shaft supporting the pinion, said second shaft having an extensible portion therein whereby to permit endwise movement of the pinion radially of the disk, said second shaft having a universal joint therein whereby to permit angular displacement thereof to move the pinion into and out of engagement with the disk, an arm rotatably but non-slidably secured to the second shaft, actuating means connected to said arm and operable to move the arm toward and away from the disk whereby to move the pinion radially with respect to the disk, a cam supported in the housing and having an actuating surface, said actuating surface having a plurality of depressions therein spaced apart distances equal to the distance between the pinion engaging portions of the disk, and a cam follower on the arm and engaged with the actuating surface of the cam, said follower operable to move against the surface of the cam as the actuating means moves the arm to move the arm axially of the disk as it moves toward and away from the disk, whereby to pivot the second shaft about the universal joint and engage the pinion with the disk when the pinion is aligned with a pinion engaging portion of the disk, and disengage the pinion from the disk when the pinion is positioned between said pinion engaging portions.

5. A variable speed transmission comprising a housing, a shaft journalled in the housing, a disk fixed to said shaft, said disk having a plurality of spaced apart circular concentric pinion engaging portions therein, a pinion drivingly engageable with said portions on the disk, a second shaft supporting the pinion, said second shaft having an extensible portion therein whereby to permit endwise movement of the pinion radially of the disk, said second shaft having a universal joint therein whereby to permit angular displacement thereof to move the pinion into and out of engagement with the disk, an arm rotatably but non-slidably supporting said arm, a bar secured to said sleeve and supported in the housing for endwise movement toward and away from the disk, said bar having a rack thereon, a drive pinion engaged with the rack, a control shaft journalled in the housing supporting said drive pinion, means to rotate the control shaft whereby to cause the drive pinion to move the bar endwise toward and away from the disk thereby moving the arm to move the first named pinion radially toward and away from the center of the disk, and cam means engaged with the arm operable to move the arm axially of the disk as it is moved toward and away from the disk whereby to pivot the second shaft about the universal joint and engage the pinion with the disk at selected radial distances from the center thereof and to disengage the pinion from the disk between said selected distances from the center thereof.

6. A variable speed transmission comprising a housing, a shaft journalled in the housing, a disk fixed to said shaft, said disk having a plurality of spaced apart circular concentric pinion engaging portions therein, a pinion drivingly engageable with said portions on the disk, a second shaft supporting the pinion, said second shaft having an extensible portion therein whereby to permit endwise movement of the pinion radially of the disk, said second shaft having a universal joint therein whereby to permit angular displacement thereof to move the pinion into and out of engagement with the disk, an arm rotatably but non-slidably supporting said arm, a bar secured to said sleeve and supported in the housing for endwise movement toward and away from the disk, said bar having a rack thereon, a drive pinion engaged with the rack, a control shaft journalled in the housing supporting said drive pinion, means to rotate the control shaft whereby to cause the drive pinion to move the bar endwise toward and away from the disk thereby moving the arm to move the first named pinion radially toward and away from the center of the disk, a cam supported in the housing and having an actuating surface, said actuating surface having a plurality of depressions therein spaced apart distances equal to the distance between the pinion engaging portions of the disk, and a cam follower on the arm and engaged with the actuating surface of the cam, said follower operable to move against the surface of the cam as the actuating means moves the arm to move the arm axially of the disk as it moves toward and away from the disk, whereby to pivot the second shaft about the universal joint and engage the pinion with the disk when the pinion is aligned with a pinion engaging portion of the disk, and disengage the pinion from the disk when the pinion is positioned between said pinion engaging portions.

7. A variable speed transmission comprising a housing, a shaft journalled in the housing, a disk fixed to said shaft, said disk having a plurality of spaced apart circular concentric pinion engaging portions therein, a pinion drivingly engageable with said portions on the disk, a second shaft supporting the pinion, said second shaft having an extensible portion therein whereby to permit endwise movement of the pinion radially of the disk, said second shaft having a universal joint therein whereby to permit angular displacement thereof to move the pinion into and out of engagement with the disk, an arm rotatably but non-slidably supporting said arm, a bar secured to said sleeve and supported in the housing for endwise movement toward and away from the disk, said bar having a rack thereon, a drive pinion engaged with the rack, a control shaft journalled in the housing supporting said drive pinion, means to rotate the control shaft whereby to cause the drive pinion to move the bar endwise toward and away from the disk thereby moving the arm to move the first named pinion radially toward and away from the center of the disk, a cam supported in the housing and having an actuating surface, said actuating surface having a plurality of depressions therein spaced apart distances equal to the distance between the pinion engaging portions of the disk, a cam follower on the arm and engaged with the actuating surface of the cam, said follower operable to move against the surface of the cam as the actuating means moves the arm to move the arm axially of the disk as it moves toward and away from the disk, whereby to pivot the second shaft about the universal joint and engage the pinion with the disk when the pinion is aligned with a pinion engaging portion of the disk, and disengage the pinion from the disk when the pinion is positioned between said pinion engaging portions; and a spring positioned on the arm between the cam follower and the sleeve slidably supporting the arm, said spring holding the follower against the cam and urging the pinion into engagement with the disk.

References Cited in the file of this patent
UNITED STATES PATENTS

| | | |
|---|---|---|
| 1,036,690 | Novak | Aug. 27, 1912 |
| 1,164,481 | Dial | Dec. 14, 1915 |